3,644,541
ISOPROPYL ALCOHOL PROCESS
Clarence D. Chang, Princeton, and Albert S. Logiudice, Bridgewater, N.J., assignors to Pullman Incorporated, Chicago, Ill.
Continuation-in-part of application Ser. No. 635,586, May 2, 1967. This application Aug. 25, 1969, Ser. No. 857,279
Int. Cl. C07c 29/08
U.S. Cl. 260—641     8 Claims

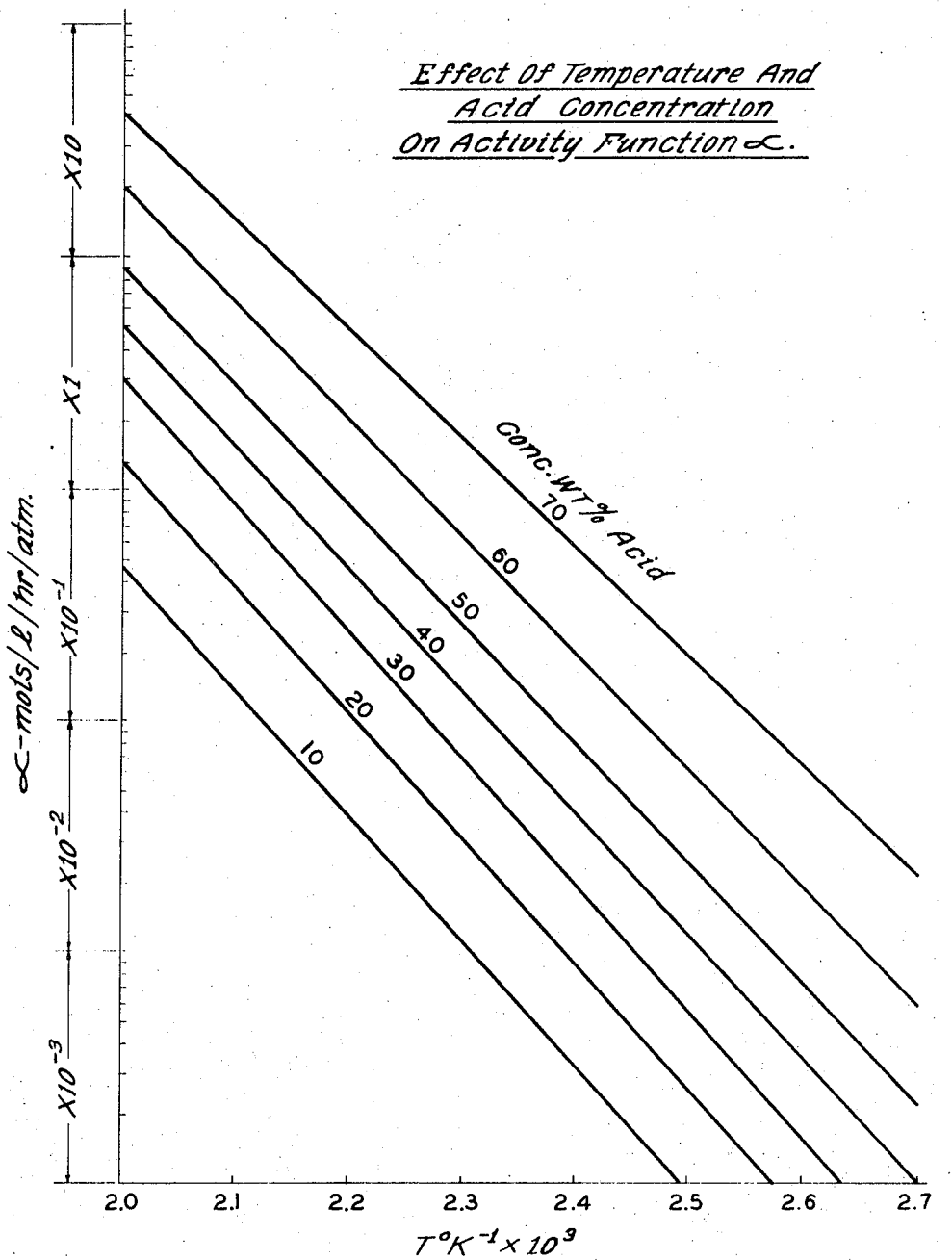

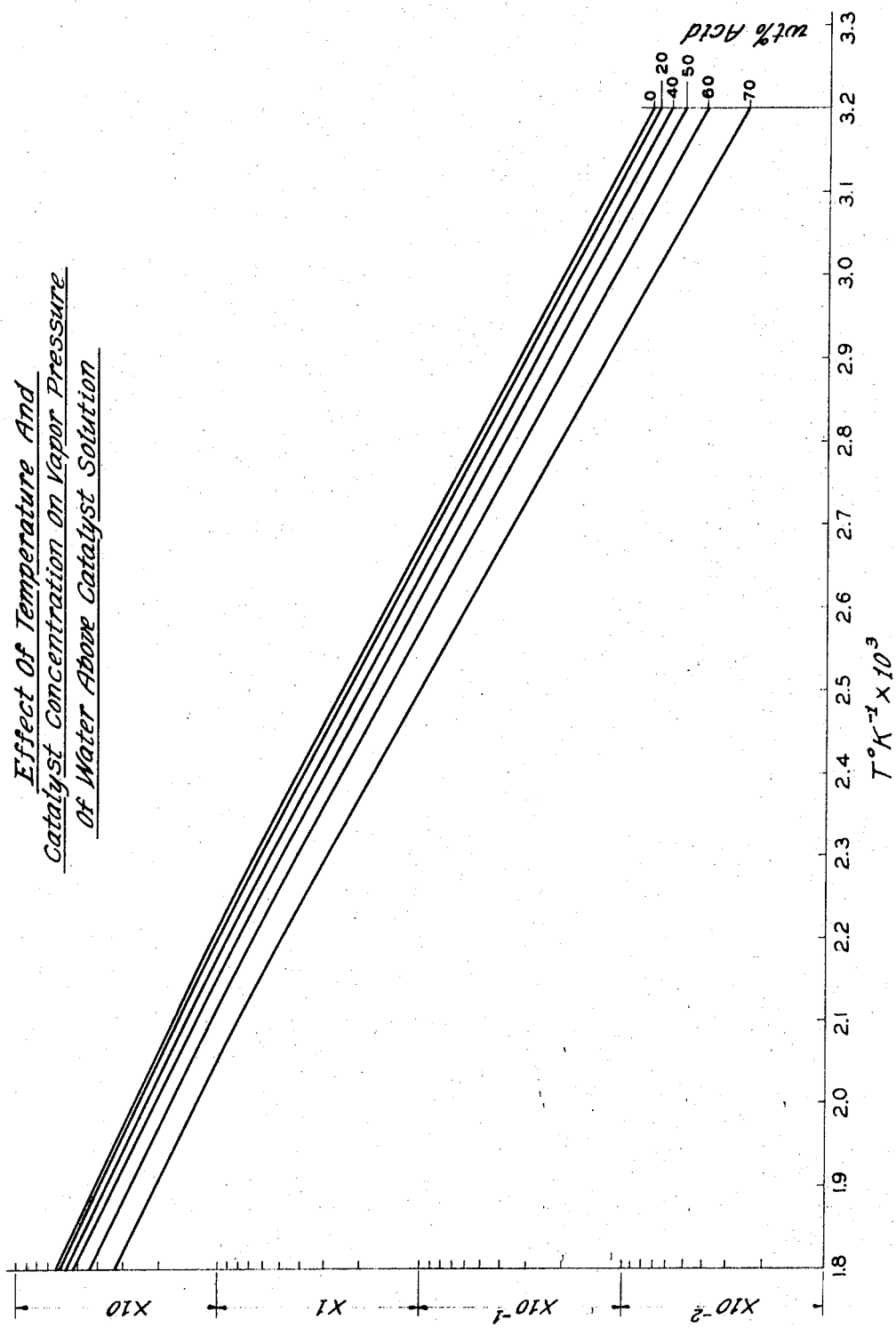

ABSTRACT OF THE DISCLOSURE

A method of achieving high conversions of water in a process for the direct hydration of propylene at elevated pressures and temperatures in the presence of an aqueous phosphoric or phosphorous acid catalyst. This is achieved by maintaining the propylene inlet partial pressure above a minimum limit, said partial pressure being a function of reaction temperature and catalyst concentration and simultaneously maintaining the propylene residence time above a minimum level, said residence time being dependent upon the reaction temperature, acid concentration and propylene inlet partial pressure. Preferably the residence time is held below an upper limit to achieve commercially acceptable yields. Preferred operating conditions include propylene inlet partial pressures below 60 atmospheres, temperatures between about 408 and 488° K. and acid concentrations ranging between about 25 and about 65 weight percent.

---

This application is a continuation-in-part of pending application Ser. No. 635,586, filed May 2, 1967 and now abandoned.

The present invention relates to a method for producing isopropyl alcohol by direct hydration of propylene in the presence of dilute aqueous mineral acids and in particular to a process wherein the alcohol is produced simultaneously at high conversions of water, at high efficiencies and high yields.

Isopropyl alcohol is commonly produced on a commercial scale from propylene by a two-stage esterification-hydrolysis reaction using a strong sulfuric acid as the esterification medium in the first stage and hydrating the ester with large quantities of water in the second stage. This process results in a very dilute isopropyl alcohol product which, therefore, has to be subjected to one or more concentration steps which require large quantities of heat. The process has many other disadvantages, among which are the necessity for reconcentration of the dilute sulfuric acid resulting from the hydrolysis step, in order to maintain the desired acid concentration in the esterification step upon recycling of the acid. Due to the large heat requirements and the inherent large cost of said reconcentration of the acid, it is desirable to operate the process under conditions that will promote high conversions per pass. These conditions, however, also promote undesired side reactions such as polymerization of propylene as well as the partial decomposition of the sulfuric acid into corrosive vapors. Consequently, it is necessary to separate and discard the undesired by-products, which typically may amount to about 15% basis propylene feed to the unit. Since at least a portion of the by-products will remain in the liquid acid phase throughout the reaction cycle it is necessary to purge the system of a portion of the acid to avoid excessive buildups of these by-products. Due to the evolution of corrosive vapors it is also necessary to use corrosion-resistant materials of construction not only in the reaction zone but also in the product recovery zone. In addition, auxiliary equipment is essential for the safe disposal of off-gases and purged sulfuric acid to avoid pollution of air and water. As a result, the process, although enjoying commercial success, has severe economic drawbacks.

Prior art also discloses proposed methods for the direct hydration of olefins, such as propylene, using dilute sulfuric acid as the catalyst, where the chemical reaction proceeds according to the following formula:

$$C_3H_6 + H_2O \rightleftharpoons C_3H_7OH$$

These methods, however, have many of the disadvantages of the two-stage process. For instance, by dilution of the acid catalyst the vaporization rate from the catalyst system is high and it is necessary to continuously add large quantities of water to the reaction zone to maintain a constant catalyst concentration. In addition, the notorious quality of sulfuric acid to promote the formation of undesired heavy by-products such as tars and polymers necessitates continuous purging of the catalyst. The cost connected with the purging and replacement of the catalyst as well as the very complicated problem of disposal of the used catalyst to minimize pollution of air and water are all serious drawbacks in the commercialization of said direct-hydration processes.

It has also been recognized that other acids such as aqueous phosphoric acid can be employed as direct hydration catalysts, although the proposed processes have never enjoyed commercial success. Phosphoric acid is a far more desirable hydration catalyst in some aspects, e.g. it is a nonvolatile acid which does not decompose to corrosive vapors under most conditions and its use would eliminate such problems as corrosion in the recovery system, contamination of the alcohol product with decomposition products necessitating additional equipment for purification and some or all of the pollution problems. Phosphoric acid is also less prone to promote undesired side reactions and purging and disposal of used catalyst thereby become less of a problem.

In other respects, however, phosphoric acid is a less desirable hydration catalyst than sulfuric acid. Phosphoric acid is a far less active hydration catalyst than sulfuric acid, and for that reason it has been recommended that higher temperatures be employed to achieve comparable conversions and space time yields, i.e., the amount of product made per unit time per reaction zone volume. Higher temperatures, however, result in increased process steam requirements, i.e., excessive amounts of water are vaporized from the catalyst system at the required higher temperatures, said amounts having to be replaced together with the water lost from the system due to the chemical reaction, resulting in poor conversions of water. In addition, the higher reaction temperatures also result in increased heat duties required to preheat the propylene feed and the water to the reaction temperature.

The space time yield may also be increased by an increase in the propylene feed rate, again resulting in an excessive loss of water from the system due to vaporization and inherent poor water conversion. Typical conversion of water reported in the art amount to about 5 percent or less.

The above-mentioned problem of low conversions of water accompanying the isopropyl alcohol production at acceptable rates expressed by the space time yield is the primary reason why the direct hydration of propylene in the presence of aqueous phosphoric acid has never achieved commercial success.

In the present invention the space time yield is defined as the moles of isopropyl alcohol produced per hour per liter of catalyst solution. The definition for water conversion is the percentage, whether on a mole or weight basis, of the total water fed to the reaction zone that is reacted with propylene to yield isopropyl alcohol. The propylene residence time measured in hour, is defined as the inverse of propylene feed rate measured in liters per hour at operating conditions per liter of catalyst solution.

It is an object of the present invention to provide a process for the direct hydration of propylene to isopropyl alcohol where high conversions of water are obtained.

It is another object of the invention to provide a process where isopropyl alcohol is produced in high yields.

Still another object of the invention is to minimize the reaction space.

Another object is to reduce the process preheat and compression requirements.

A further object is to produce isopropyl alcohol uncontaminated by decomposition products from the catalyst.

Yet another object is to provide a process where the need for employing corrosion-resistant materials of construction in the recovery zones is obviated.

Still a further object is to produce isopropyl alcohol at high yields and efficiencies in a process devoid of pollution problems.

These and other objects of the invention will become apparent to those skilled in the art from the accompanying description and disclosure.

FIG. 1 shows the experimentally determined correlation between the activity function $\alpha$, expressing the production of isopropyl alcohol in mols per hour per liter of catalyst per atmosphere, and 1000 times the reciprocal temperature $$\left(\frac{1000}{T^\circ K.}\right)$$

with parameters of acid concentration in weight percent.

FIG. 2 depicts the effect of 1000 times the reciprocal temperature $$\left(\frac{1000}{T^\circ K.}\right)$$

on vapor pressure of water in atmospheres, above the catalyst solution with parameters of acid concentration in weight percent.

In accordance with the present invention the above objects are accomplished by intimately contacting in a reaction zone propylene vapor with an aqueous catalyst solution of a non-volatile mineral acid taken from the group consisting of phosphorous and phosphoric acid at elevated temperatures and pressures wherein the inlet propylene partial pressure is maintained above $$\left(\frac{1}{\alpha} + \frac{P_w}{9C^\circ}\right)$$

atmospheres and the propylene residence time in said reaction zone is above a lower limit about $$\frac{C^\circ}{\alpha R T}\left(\frac{P_w}{9PC^\circ - P_w}\right)$$

hours, where $\alpha$ is the function of catalyst concentration and temperature determinable from FIG. 1, $P_w$ is the vapor pressure of water in atmospheres over the catalyst solution, $C^\circ$ is the thermodynamic equilibrium fractional conversion, $R$ is the gas constant in $$\frac{(lit.)(atm.)}{^\circ K.}$$

T is the temperature in degrees Kelvin and P is the inlet partial pressure of propylene in atmospheres, feeding water to the reaction zone to maintain the aqueous catalyst solution at about a constant concentration, withdrawing vaporous effluent comprising isopropyl alcohol, water and unreacted propylene from the reaction zone and recovering isopropyl alcohol from said effluent.

The value for R can be found in any standard handbook, e.g. Chemical Engineers' Handbook, John H. Perry, McGraw-Hill, Third edition, page 290, Table 1. In that pressures, volumes, temperatures, and moles are expressed in terms of atmospheres, liters, degrees Kelvin and gram moles respectively, throughout the present specification and claims, the appropriate value for R is 0.082.

The effect of changing operating conditions on the production of isopropyl alcohol and on the water conversion is extremely complicated since the operating variables are all interrelated, i.e., the quantitative effect of changing one variable from one level to another depends upon the levels of the remaining operating variables. However, it has been discovered that for a given combination of reactor temperature and catalyst concentration there is a minimum allowable propylene inlet partial pressure requirement, and it has further been discovered that for any given combination of reactor temperature, catalyst concentration and allowable propylene inlet partial pressure there is a particular minimum level of propylene residence time that will result in high water conversion; in effect by operating above the minimum limits of the invention it is always possible to achieve water conversions exceeding about 10 percent and typical conversions of water amount to about 25 percent and higher. On the other hand, if a combination of operating conditions were to be selected resulting in that one or both of the restrictions as to propylene inlet partial pressure and propylene residence time not being met, acceptable conversions of water can not be achieved.

As mentioned before, there is a complicated interrelationship between the operating variables. It has been discovered, however, that levels of reactor temperature and catalyst concentration can be selected independently of each other. The critical minimum limit of the propylene residence time is not directly affected by the catalyst concentration, however, but is a function of the activity of the catalyst solution as expressed by the activity function $\alpha$, the latter being dependent on temperature as well as catalyst concentration, i.e. an increase in either independent variable will result in an increase in the level of $\alpha$. In the experimentations it was found the $\alpha$ is affected by temperature, expressed in degrees Kelvin and concentration of acid, expressed in weight percent, according to the relationship depicted in FIG. 1. Appropriate values for $\alpha$ at concentrations not indicated on the figure may be found by interpolation. Also, the graph may be extended beyond the indicated temperature range to obtain values for $\alpha$ at temperatures exceeding 520° K. or even higher.

The limits of the propylene inlet partial pressure as well as that of the propylene residence time are a function of the calculated thermodynamic equilibrium conversion at 100% selectivity, which may readily be calculated from the definition of the equilibrium constant $$K_p = \frac{P^\circ_{IPA}}{(P^\circ_{c3^-})(P^\circ_w)}$$

$P^\circ_X$ = outlet partial pressure in atmospheres of component X at equilibrium,
and where the subscripts identify component X:
IPA = isopropyl alcohol
$C_3^-$ = propylene,
$w$ = water.

Values for $K_p$ may be found directly or calculated from data in the literature. In this work the thermodynamic data reported by C. S. Cope in Journal of Chemical and Engineering Data, volume 11, page 379, 1966, were employed in relating $K_p$ to absolute temperature expressed in degrees Kelvin according to the following expression:

$$\log_{10} K_p = \frac{2325.6}{T} - 4.763 \log_{10} T + 3.4 \times 10^{-3} T$$
$$- 0.796 \times 10^{-6} T^2 + 4.436$$

The particular values for $K_p$ used do not affect the actual limits for residence time, but for a given expression of those limits, consistent equilibrium $K_p$ values must of course be used.

It has been verified in the experimentation that vapor pressure of water above the catalyst solution may be substituted for the outlet partial pressure of water, thus simplifying the calculations, as the vapor pressure of water above the catalyst depends only upon the temperature and catalyst concentration, according to the relationship shown in FIG. 2. This graph is based on data obtained in vapor pressure measurements of water above aqueous solutions of phosphoric acid, however, it was found that the relationships hold for phosphorous acid solutions as well. Appropriate vapor pressures at concentrations of acid not indicated on the graph may then be obtained by interpolation. The graph may also be extended to a reasonable degree to obtain vapor pressure data at temperatures outside the indicated ranges. It can then be shown by simple mathematical techniques that the fraction of equilibrium conversion can be reduced to the following expression:

$$C° = \frac{1}{1 + (K_p \cdot P_w)^{-1}}$$

In addition to entering into the calculation of fractional equilibrium conversion, the vapor pressure of water above the catalyst solution affects directly the respective limits of propylene inlet partial pressure and propylene residence time.

From the above it is evident that the limits of the invention are functions either directly or indirectly of the operating variables reaction temperature and catalyst concentration, which may be selected independent of each other.

Thus, the procedure for carrying out the invention in the intended manner will consist of the following steps:

(1) Independent selection of reaction temperature
(2) Independent selection of catalyst concentration
(3) Determination of $\alpha$ from FIG. 1
(4) Determination of $P_w$ from FIG. 2
(5) Calculation of $K_p$ from equation
(6) Calculation of $C°$ from equation
(7) Calculation of minimum value of P
(8) Selection of P above minimum level
(9) Calculation of minimum limit of residence time ($t$) from inequality
(10) Selection of $t$ above the calculated limit Preferably, the propylene residence time is simultaneously maintained below an upper limit defined by the expression $$\frac{C°}{\alpha RT}(\alpha P - 1)$$

hours to achieve high space-time yields. When carrying out the invention within the preferred range the space-time yields will amount to at least 1 mole per hour per liter of catalyst, however, generally considerably higher space-time yields are obtained rendering the process extremely attractive and efficient.

Although the invention broadly covers any combination of temperature and catalyst concentration it has been found that very excellent results are obtained when operations are carried out under what is generally considered mild conditions for a phosphoric or phosphorous acid catalyst system.

Specifically, the reaction temperature is preferably held between a range of about 408° K. and about 488° K. and most preferably between about 418° K. and about 458° K. The acid catalyst solution concentration is preferably maintained between about 25 weight percent and about 65 weight percent. When one or both of the above mentioned preferred ranges of operating conditions are employed, the problems of corrosion occurring in the reaction zone are easily solved by utilizing commercially available acid-resistant materials of construction for the reactor, for instance, acid resistant ceramic linings.

In addition, it has been found that it is not necessary to compensate for the relatively mild conditions of temperature and catalyst concentration by an excessively high pressure, which otherwise would complicate the design of the reaction zone and substantially add to the cost of the process. In fact, very excellent results are obtained by operations at total pressures corresponding to inlet propylene pressures below 60 atmospheres and in most cases commercially attractive results are obtained at propylene inlet partial pressures below 40 atmospheres.

In addition to the above mentioned advantages of operations between the preferred ranges, it was found that the selectivity of the process is high and that the only by-product of the hydration reaction is diisopropyl ether. Said production of small quantities of diisopropyl ether causes no problems in the process, since it is easily recovered from the alcohol-product and can advantageously be recycled to extinction. Thus, under recycle operations there will be no significant net production of diisopropyl ether and the selectivity of the process will approach 100 percent.

The catalyst system is stable and no deterioration of the catalyst is encountered either due to decomposition of the acid or due to build-up of heavy by-products such as tars, polymers, etc., and consequently no problems connected with catalyst purging and acid disposal problems will be encountered.

The reactor may be of any suitable design, as long as intimate contact is obtained between the propylene and the catalyst solution. This may be achieved in a mechanically stirred reactor or in a sparged tower. The reactor may also be provided with baffles, or may be partially filled with solid inert bodies such as saddles to insure good dispersion of the propylene gas throughout the reactor.

Water has to be continually fed to the reactor system to make up for the losses incurred due to the reaction itself, as well as the vaporization. This make-up water may be introduced either in the liquid form or as steam. Advantageously, at least a portion of the water obtained in subsequent product recovery steps may be recycled to the reactor.

Isopropyl alcohol product present in the gaseous reactor effluent, which also will contain water and unreacted propylene, may be recovered by any method known in the art, e.g., the effluent may be cooled to condense a mixture of water and isopropyl alcohol and the condensate may be subject to one or more distillation steps to recover a concentrated isopropyl alcohol product.

Uncondensed propylene is advantageously fed back to the reactor with sufficient fresh propylene feed to maintain a balance.

For a better understanding of the invention, reference is now had to the following examples which are not to be construed as in any way limiting to the scope of the invention.

The experimental apparatus consisted of a vertical glass reactor having an inner diameter of approximately one inch and which was enclosed in an electrically heated steel shell. The propylene feed and sufficient water to maintain the catalyst concentration at the desired level were introduced through a frit into the bottom of the reactor, which in all instances was charged with about 375 milliliters of catalyst solution. The effluent stream emerging from the top of the reactor was cooled in a series of steps with water, wet ice and Dry ice-acetone to condense all but unreacted propylene. The duration of the experiments were sufficient to obtain steady-state operations as well as to collect adequate samples for analysis. Analyses were made of the gaseous reactor effluents, the liquid condensates and the uncondensed gas streams using gas chromatographic and mass spectrometry methods.

The effects of operating variables were investigated over a wide range of conditions, e.g., temperature from 373° K. to 517° K., acid concentration between 5 and 70 weight percent, propylene inlet partial pressures between about 1 and about 51 atmospheres. For convenience the results of the experiments have been summarized in table form. Table 1 includes all those experiments wherein the propylene residence time and the propylene inlet partial pressures were maintained above their respective minimum limits, while Table 2 summarizes the results from experimentations where one or both of the restrictions as to said operating variables were not adhered to, in other words, conditions were employed outside the limits of the invention. A comparison of the two tables reveals the significantly higher water conversions obtained when operating within the conditions of the invention, i.e., conversions ranging between about 19 and about 51 percent were observed, while operations outside the limits of the invention produced only very low water conversions ranging between about 0.1 percent and about 9 percent. Table 1 includes also a column listing the upper preferred limits as to propylene residence time, and it is clearly evident that operations outside said upper preferred limit result in low space-time yields while a choice of propylene residence times below said preferred limit will result in acceptable yields for commercial operations, in fact, employing residence times of less than 20 percent of the upper preferred limit results in extremely attractive operations, as evidenced, for instance, by experiments No. 10–14 where space-time yields ranging between about 5.3 and 10.5 were obtained while high water conversions of about 20–54 percent were simultaneously achieved.

In addition to these experiments which were all carried out using aqueous phosphoric acid as catalyst, an additional experiment was run to demonstrate that equally good results may be obtained using aqueous phosphorous acid catalyst. The pertinent data are presented in the following Table 3.

TABLE 1.—DIRECT HYDRATION OF PROPYLENE. PHOSPHORIC ACID CATALYST, INSIDE LIMITS OF INVENTION

| Ex. No. | Temp. °K. | Acid conc., wt. percent | Propylene inlet. p.p. atm. | Propylene residence time. hr. | Minimum propylene inlet. p.p. atm. | Minimum propylene residence time. hr. | Preferred max. propylene residence time. hr. | Conversion of water mol percent | pace-time yield, mols liter/hrs. |
|---|---|---|---|---|---|---|---|---|---|
| 1 | 447 | 37.0 | 28.37 | 0.025 | 9.2 | 0.004 | 0.100 | 23.9 | 2.45 |
| 2 | 422 | 48.5 | 17.89 | 0.017 | 10.6 | 0.006 | 0.047 | 22.4 | 1.77 |
| 3 | 420 | 48.5 | 22.18 | 0.074 | 12.6 | 0.006 | 0.050 | 29.0 | 0.43 |
| 4 | 423 | 48.5 | 31.50 | 0.033 | 10.3 | 0.003 | 0.113 | 44.5 | 2.13 |
| 5 | 423 | 48.5 | 51.10 | 0.049 | 10.3 | 0.002 | 0.208 | 37.5 | 1.96 |
| 6 | 424 | 48.5 | 31.67 | 0.031 | 11.4 | 0.004 | 0.113 | 39.0 | 2.17 |
| 7 | 447 | 48.5 | 22.00 | 0.010 | 7.3 | 0.003 | 0.079 | 24.9 | 5.01 |
| 8 | 448 | 48.5 | 39.45 | 0.034 | 6.8 | 0.001 | 0.151 | 53.4 | 3.91 |
| 9 | 448 | 48.5 | 36.90 | 0.031 | 6.8 | 0.001 | 0.141 | 33.8 | 2.87 |
| 10 | 463 | 48.5 | 25.51 | 0.022 | 8.6 | 0.001 | 0.085 | 25.8 | 3.65 |
| 11 | 423 | 60.0 | 31.98 | 0.016 | 5.6 | 0.001 | 0.118 | 53.6 | 5.26 |
| 12 | 443 | 60.0 | 16.10 | 0.004 | 5.6 | 0.001 | 0.051 | 19.7 | 8.48 |
| 13 | 443 | 60.0 | 15.30 | 0.004 | 5.6 | 0.001 | 0.049 | 21.4 | 10.04 |
| 14 | 444 | 60.0 | 29.05 | 0.007 | 5.3 | 0.0006 | 0.099 | 34.1 | 10.48 |
| 15 | 447 | 60.0 | 28.94 | 0.013 | 5.9 | 0.0006 | 0.092 | 39.3 | 6.26 |
| 16 | 400 | 65.0 | 40.75 | 0.044 | 10.5 | 0.001 | 0.134 | 65.3 | 1.39 |
| 17 | 422 | 65.0 | 11.63 | 0.006 | 4.4 | 0.002 | 0.033 | 19.4 | 3.14 |
| 18 | 425 | 65.0 | 15.42 | 0.008 | 4.2 | 0.001 | 0.048 | 51.7 | 4.39 |
| 19 | 425 | 65.0 | 11.19 | 0.004 | 4.2 | 0.002 | 0.033 | 24.0 | 5.15 |
| 20 | 426 | 70.0 | 12.34 | 0.005 | 3.2 | 0.0008 | 0.032 | 28.7 | 4.21 |
| 21 | 426 | 70.0 | 12.77 | 0.003 | 3.1 | 0.0007 | 0.033 | 23.7 | 5.79 |

TABLE 2.—DIRECT HYDRATION OF PROPYLENE, PHOSPHORIC ACID CATALYST, OUTSIDE LIMITS OF INVENTION

| Ex. No. | Temp. °K. | Acid conc., wt. percent | Propylene inlet, p.p. atm. | Propylene residence time, hr. | Minimum propylene inlet, p.p. atm. | Minimum propylene residence time, hr. | Conversion of water, mol percent | Space-time yield, mols/liter/hr. |
|---|---|---|---|---|---|---|---|---|
| 22 | 478 | 14.0 | 19.25 | 0.018 | 16.0 | 0.022 | 8.3 | 2.13 |
| 23 | 451 | 65.0 | 6.45 | 0.006 | 5.7 | 0.007 | 8.5 | 1.89 |
| 24 | 443 | 37.0 | 9.46 | 0.009 | 9.3 | 0.020 | 6.4 | 1.57 |
| 25 | 517 | 22.0 | 11.63 | 0.009 | 32.8 | 0.0009 | 3.1 | 2.73 |
| 26 | 444 | 25.0 | 11.22 | 0.010 | 14.7 | 0.028 | 6.2 | 1.27 |
| 27 | 463 | 48.5 | 3.95 | 0.003 | 8.6 | ~0 | 3.5 | 2.67 |
| 28 | 373 | 5.0 | 12.25 | 0.014 | 2500.0 | 6.249 | 0.7 | <0.01 |
| 29 | 373 | 5.0 | 34.01 | 0.038 | 2500.0 | 2.2043 | 0.7 | <0.01 |
| 30 | 463 | 5.0 | 1.02 | 0.001 | 39.6 | ~0 | 0.1 | 0.16 |
| 31 | 463 | 5.0 | 22.79 | 0.019 | 39.6 | 0.0886 | 2.2 | 0.22 |
| 32 | 444 | 5.3 | 19.86 | 0.017 | 104.7 | 0.1615 | 2.6 | 0.34 |
| 33 | 393 | 14.0 | 33.20 | 0.036 | 1667.5 | 0.2180 | 3.6 | 0.03 |
| 34 | 443 | 15.0 | 24.08 | 0.047 | 32.6 | 0.0333 | 9.2 | 0.42 |
| 35 | 373 | 30.0 | 14.42 | 0.016 | 1667.0 | 0.3490 | 0.5 | 0.01 |
| 36 | 393 | 30.0 | 13.49 | 0.014 | 341.2 | 0.1269 | 1.2 | 0.04 |
| 37 | 393 | 30.0 | 19.91 | 0.021 | 341.2 | 0.842 | 2.5 | 0.06 |
| 38 | 418 | 30.0 | 20.50 | 0.019 | 47.5 | 0.0293 | 5.8 | 0.35 |
| 39 | 419 | 30.0 | 20.84 | 0.189 | 54.7 | 0.0288 | 0.6 | <0.01 |
| 40 | 401 | 34.0 | 18.26 | 0.019 | 68.2 | 0.0960 | 4.7 | 0.26 |
| 41 | 373 | 48.5 | 11.85 | 0.013 | 333.6 | 0.0949 | 1.8 | 0.03 |
| 42 | 373 | 48.5 | 34.29 | 0.040 | 333.6 | 0.0321 | 8.3 | 0.05 |

TABLE 3.—DIRECT HYDRATION OF PROPYLENE, PHOSPHOROUS ACID CATALYST, INSIDE LIMITS OF INVENTION

| Ex. No. | Temp. °K. | Acid conc. wt. percent | Propylene inlet. p.p. atm. | Propylene residence time. hr. | Minimum propylene inlet. p.p. atm. | Minimum propylene residence time. hr. | Preferred max. propylene residence time. hr. | Conversion of water mol percent | Space-time yield, mols/ liter/hr. |
|---|---|---|---|---|---|---|---|---|---|
| 43 | 450 | 37 | 21.60 | 0.020 | 10.3 | 0.007 | 0.078 | 22.8 | 2.76 |

Many modifications and alterations of this invention will be apparent to those skilled in the art and may be used without departing from the spirit and scope of the present invention which is defined only by the claims.

What is claimed is:

1. A process for the continuous production of isopropyl alcohol comprising:
intimately contacting in a reaction zone propylene vapor with an aqueous catalyst solution of a nonvolatile mineral acid taken from the group consisting of phosphorous and phosphoric acid at elevated temperatures and pressures wherein the inlet propylene partial pressure is maintained above $$\left(\frac{1}{\alpha}+\frac{P_w}{9C°}\right)$$

atmospheres and the propylene residence time in said reaction zone is above a lower limit of about $$\frac{C°}{\alpha RT}\left(\frac{P_w}{9PC°-P_w}\right)$$

hours, where $\alpha$ is a function of catalyst concentration and temperature determinable from FIG. 1, $P_w$ is the vapor pressure of water in atmospheres over the catalyst solution, $C°$ is the thermodynamic equilibrium conversion, R is the gas constant in $$\frac{(lit)(atm.)}{°K.}$$

T is the temperature in degrees Kelvin and P is the inlet partial pressure of propylene in atmospheres, feeding water to the reaction zone to maintain the aqueous catalyst solution at about a constant concentration, withdrawing vaporous effluent comprising isopropyl alcohol, water and unreacted propylene from the reaction zone and recovering alcohol from said effluent.

2. A process according to claim 1 wherein the propylene residence time in said reaction zone is maintained below an upper limit of about $$\frac{C°}{\alpha RT}(\alpha P-1)$$

hours.

3. A process according to claim 1 wherein the inlet propylene pressure is maintained below about 60 atmospheres.

4. A process according to claim 1 wherein the temperature is maintained between about 408° K. and about 488° K.

5. A process according to claim 1 wherein the concentration of the aqueous acid catalyst solution is maintained between about between about 25 weight percent and about 65 weight percent.

6. A process according to claim 2 wherein the temperature is maintained between about 418° K. and about 458° K.

7. A process according to claim 2 wherein the inlet propylene pressure is maintained below about 40 atmospheres.

8. A process according to claim 2 wherein the propylene residence time is about 20 percent of the upper limit.

References Cited
UNITED STATES PATENTS

| | | | |
|---|---|---|---|
| 2,050,445 | 8/1936 | Metzger | 260—641 |
| 2,093,426 | 9/1937 | Dreyfus | 260—641 |
| 2,118,882 | 5/1938 | Francis | 260—641 |
| 2,141,275 | 12/1938 | Lewis | 260—641 |
| 2,142,036 | 12/1938 | Rowland et al. | 260—641 |

HOWARD T. MARS, Primary Examiner

U.S. Cl. X.R.

260—614 A